(12) United States Patent
Chu et al.

(10) Patent No.: US 11,601,999 B2
(45) Date of Patent: Mar. 7, 2023

(54) APPARATUS AND METHOD FOR MULTI-LINK MANAGEMENT

(71) Applicant: NXP USA, Inc., Austin, TX (US)

(72) Inventors: Liwen Chu, San Ramon, CA (US); Young Hoon Kwon, Laguna Niguel, CA (US); Hongyuan Zhang, Fremont, CA (US); Hui-Ling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/139,640

(22) Filed: Dec. 31, 2020

(65) Prior Publication Data

US 2021/0212141 A1 Jul. 8, 2021

Related U.S. Application Data

(60) Provisional application No. 62/957,184, filed on Jan. 4, 2020.

(51) Int. Cl.
*H04W 24/02* (2009.01)
*H04W 76/15* (2018.01)
*H04W 88/10* (2009.01)
*H04W 40/24* (2009.01)

(52) U.S. Cl.
CPC .......... *H04W 76/15* (2018.02); *H04W 24/02* (2013.01); *H04W 40/244* (2013.01); *H04W 88/10* (2013.01)

(58) Field of Classification Search
CPC ... H04W 76/15; H04W 24/02; H04W 40/244; H04W 88/10; H04W 48/14; H04W 84/12; H04W 48/12; H04W 68/00; H04L 45/24
See application file for complete search history.

(56) References Cited

U.S. PATENT DOCUMENTS

| | | | |
|---|---|---|---|
| 2019/0150214 A1* | 5/2019 | Zhou | H04W 8/24 370/329 |
| 2020/0221545 A1* | 7/2020 | Stacey | H04W 48/16 |
| 2021/0029588 A1* | 1/2021 | Cariou | H04W 28/0263 |

FOREIGN PATENT DOCUMENTS

| WO | WO-2020246708 A1 * | 12/2020 | |
|---|---|---|---|
| WO | WO-2021011476 A1 * | 1/2021 | ............ H04W 48/12 |

OTHER PUBLICATIONS

Park et al. (U.S. Appl. No. 62/901,136), filed Sep. 2019.*
Patil et al. (U.S. Appl. No. 62/873,827), filed Jul. 2019.*

* cited by examiner

*Primary Examiner* — Lakeram Jangbahadur (57) ABSTRACT

Embodiments of a method and device for multi-link communications are disclosed. In an embodiment, a method of multi-link communications involves, at a multi-link STA device (STA MLD) that supports a first link, link1, and a second link, link2, receiving a beacon on link2, acquiring an updated critical operating parameter for link1 in response to the beacon received on link2, and operating link1 according to the acquired updated critical operating parameter.

19 Claims, 7 Drawing Sheets

APPARATUS AND METHOD FOR MULTI-LINK MANAGEMENT

CROSS-REFERENCE TO RELATED APPLICATIONS

This application is entitled to the benefit of U.S. Provisional Patent Application Ser. No. 62/957,184, filed on Jan. 4, 2020.

BACKGROUND

In multi-link communications, an access point (AP) multi-link device, e.g., an AP multi-link logical device (MLD) or an AP multi-link logical entity (MLLE), can buffer data and transmit buffered data to a non-AP multi-link device, e.g., an STA multi-link device (STA MLD) or an STA multi-link logical entity (STA MLLE), via one or more communication links. For example, a wireless AP multi-link device may wirelessly transmit buffered data to one or more wireless stations in a non-AP multi-link device via one or more wireless communication links. In a multi-link Basic Service Set (BSS) established by an AP MLD, a management frame (e.g., a beacon) transmitted on one link is used to transmit information of multiple links to update link operating parameters. With this technique, a STA MLD can finish the association through one link with an AP MLD, and a STA MLD can determine the information of multiple links by monitoring one link.

SUMMARY

Embodiments of a method and device for multi-link communications are disclosed. In an embodiment, a method of multi-link communications involves, at a multi-link STA device (STA MLD) that supports a first link, link1, and a second link, link2, receiving a beacon on link2, acquiring an updated critical operating parameter for link1 in response to the beacon received on link2, and operating link1 according to the acquired updated critical operating parameter.

In an embodiment, acquiring the updated critical operating parameter for link1 includes triggering the receiving of beacons on link1.

In an embodiment, the beacon received on link2 includes an announcement that link1 has an updated critical operating parameter, and upon receiving the announcement on link2 at the STA MLD, start receiving beacons on link1 to acquire the updated critical operating parameter.

In an embodiment, the beacon on link2 includes a Target Beacon Transmission Time (TBTT) difference between link1 and link2.

In an embodiment, acquiring the updated critical operating parameter for link1 involves reading information carried in the beacon on link2 if the beacon on link2 carries the updated critical operating parameters of link1.

In an embodiment, the STA MLD uses link1 as a working link and starts to receive beacons on link1 once the announcement is received on link2.

In an embodiment, acquiring the updated critical operating parameter for link1 involves using a Probe Request on link1 to solicit a Probe Response on link1, and acquiring the updated critical operating parameter for link1 via link1.

In an embodiment, acquiring the updated critical operating parameter for link1 involves using a Probe Request on link2 to solicit a Probe response on link2, and acquiring the updated critical operating parameter for link1 via link2.

In an embodiment, the STA MLD is further configured to use a management frame on link2 to acquire the updated critical operating parameter for link1.

In an embodiment, the STA MLD is further configured to use a same listen interval for all of the STA MLD's STAs.

An embodiment of a STA MLD is disclosed. The STA MLD includes a processor configured to communicate with an access point (AP) MLD via a first link, link1, and a second link, link2, a receive a beacon on link2, acquire an updated critical operating parameter for link1 in response to the beacon received on link2, and operate link1 according to the acquired updated critical operating parameter.

In an embodiment, the STA MLD is further configured to trigger the receipt of beacons on link1 in response to receiving the beacon on link2.

In an embodiment, the beacon received on link2 includes an announcement that link1 has an updated critical operating parameter, and the STA MLD is further configured to, upon the receipt of the announcement on link2, start receiving the beacons on link1 to acquire the updated critical operating parameter.

In an embodiment, the beacon received on link2 includes a TBTT difference between link1 and link2.

In an embodiment, the STA MLD uses link1 as a working link and starts to receive beacons on link1 once the announcement is received on link2.

In an embodiment, the STA MLD is further configured to use a Probe Request on link1 to solicit a Probe Response on link1, and to acquire the updated critical operating parameter for link1 via link1.

In an embodiment, the STA MLD is further configured to use a Probe Request on link2 to solicit a Probe Response on link2, and to acquire the updated critical operating parameter for link1 via link2.

In an embodiment, the STA MLD is further configured to use a management frame on link2 to acquire the updated critical operating parameter for link1.

In an embodiment, the STA MLD is further configured to use a same listen interval for all of the STA MLD's STAs.

Another embodiment of a STA MLD is disclosed. The STA MLD includes a processor configured to communicate with an access point (AP) MLD via a first link, link1, and a second link, link2, receive a beacon on link2, wherein the beacon on link2 includes an updated critical operating parameter for link1, and operate link1 according to the updated critical operating parameter received via the beacon on link2.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

To effectively announce network information and the presence of a wireless local area network (WLAN), an access point (AP) multi-link device may transmit management frames on all links in one embodiment or on multiple links in another embodiment. In one embodiment, a management frame is a beacon in which information about a network is transmitted periodically by an AP multi-link device (AP MLD) to a non-AP multi-link device in a multi-link infrastructure basic service set (BSS). To allow a STA MLD to monitor a beacon on only one link, beacons in a link (e.g., link1) may carry information of link1 and minimal information of other links (e.g., link2), which can help the STA MLD save power.

In a multi-link BSS established by an AP MLD, a beacon transmitted on one link may be used to announce the occurrence of a critical update of another link. Using such a technique, a STA MLD can monitor one link only after the association to save power. In a multi-link BSS established by an AP MLD, after receiving an announcement of a critical update of one link (e.g., link2) through the beacon in another link (e.g., link1), a STA MLD can acquire the critical update in either link1 or link2. Using such a technique, the STA MLD can monitor one link only after the association to save power.

Figure 1:
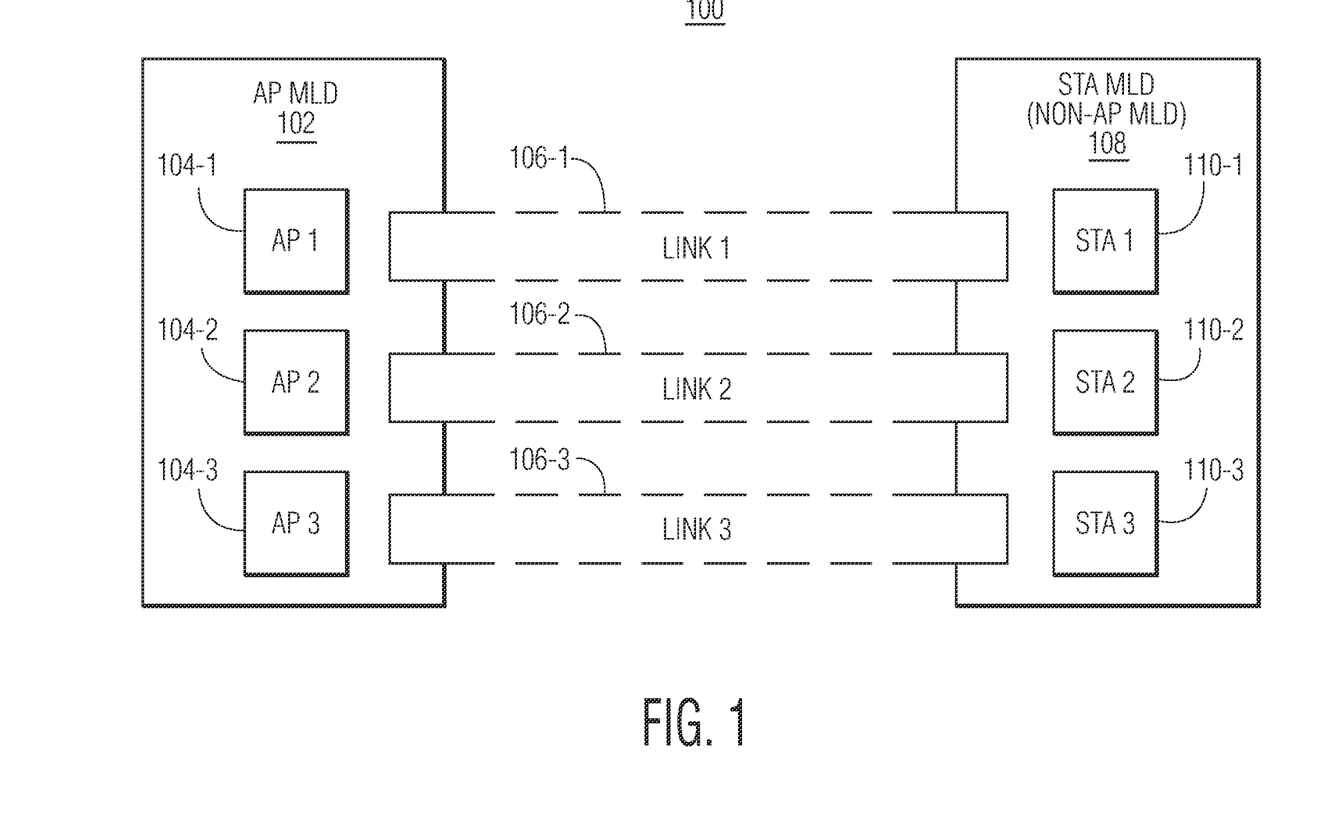
FIG. 1 depicts a multi-link communications system in accordance with an embodiment of the invention.

FIG. 1 depicts a multi-link communications system 100 that includes at least one AP multi-link device, which is implemented as an AP MLD 102, and at least one STA multi-link device, which is implemented as an STA MLD 108. The multi-link communications system 100 shown in FIG. 1 can be used in various applications, such as industrial applications, medical applications, computer applications, and/or consumer or enterprise applications. In some embodiments, the multi-link communications system 100 is a wireless communications system, such as a wireless communications system compatible with an Institute of Electrical and Electronics Engineers (IEEE) 802.11 protocol. For example, the multi-link communications system may be a wireless communications system compatible with the IEEE 802.11be protocol. Although the depicted multi-link communications system 100 is shown in FIG. 1 with certain components and described with certain functionality herein, other embodiments of the multi-link communications system shown in FIG. 1 may include fewer or more components to implement the same, less, or more functionality. For example, in some embodiments, the multi-link communications system includes multiple AP MLDs with one STA MLD, or multiple AP MLDs with more than one STA MLD. In another example, although the multi-link communications system 100 is shown in FIG. 1 as being connected in a certain topology, the network topology of the multi-link communications system 100 is not limited to the topology shown in FIG. 1.

In the embodiment depicted in FIG. 1, the AP MLD 102 includes multiple access points as APs 104-1, 104-2, and 104-3. In some embodiments, the AP MLD 102 implements upper layer Media Access Control (MAC) functionalities (e.g., beacon configuration, reordering of frames, etc.) and the APs 104-1, 104-2, and 104-3 implement lower layer MAC functionalities (e.g., backoff, frame transmission, frame reception, etc.). The APs 104-1, 104-2, and 104-3 may be implemented in hardware (e.g., circuits), software, firmware, or a combination thereof. The APs 104-1, 104-2, and 104-3 may be fully or partially implemented as an integrated circuit (IC) device. In some embodiments, the APs 104-1, 104-2, and 104-3 are wireless APs compatible with at least one WLAN communications protocol (e.g., at least one IEEE 802.11 protocol). For example, the APs 104-1, 104-2, and 104-3 may be wireless APs compatible with the IEEE 802.11be protocol. In some embodiments, an AP MLD connects to a local area network (e.g., a LAN) and/or to a backbone network (e.g., the Internet) through a wired connection and that wirelessly connects to wireless stations (STAs), STA MLDs, for example, through one or more WLAN communications protocols, such as the IEEE 802.11 protocol. In some embodiments, an AP includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller is implemented within a processor, such as a microcontroller, a host processor, a host, a digital signal processor (DSP), or a central processing unit (CPU), which can be integrated in a corresponding transceiver. Each of the APs 104-1, 104-2, or 104-3 of the AP MLD 102 may operate in a different frequency band. For example, the AP 104-1 may operate in a 2.4 gigahertz (GHz) frequency band, the AP 104-2 may operate in a 5 GHz frequency band, and the AP 104-3 may operate in a 6 GHz frequency band. Although the AP MLD 102 is shown in FIG. 1 as including three APs, other embodiments of the AP MLD 102 may include fewer than three APs or more than three APs.

In the embodiment depicted in FIG. 1, the non-AP STA multi-link device, implemented as STA MLD 108, includes multiple non-AP stations, which are implemented as STAs 110-1, 110-2, and 110-3. The STAs 110-1, 110-2, and 110-3 may be implemented in hardware (e.g., circuits), software, firmware, or a combination thereof. The STAs 110-1, 110-2, and 110-3 may be fully or partially implemented as an IC device. In some embodiments, the non-AP STAs 110-1, 110-2, and 110-3 are part of the STA MLD 108, such that the STA MLD is a wireless device that wirelessly connect to wireless APs. For example, the STA MLD 108 may be a laptop, a desktop personal computer (PC), a mobile phone, or other wireless device that supports at least one WLAN communications protocol. In some embodiments, the non-AP STA MLD 108 is a wireless device compatible with at least one IEEE 802.11 protocol (e.g., the IEEE 802.11be protocol). In some embodiments, the STA MLD 108 implements a common MAC data service interface and the non-AP STAs 110-1, 110-2, and 110-3 implement a lower layer MAC data service interface. In some embodiments, the AP MLD 102 and/or the STA MLD 108 identifies which communication links support the multi-link operation during a multi-link operation setup phase and/or exchanges information regarding multi-link capabilities during the multi-link operation setup phase. Each of the non-AP STAs 110-1, 110-2, 110-3 of the STA MLD 108 may operate in a different frequency band. For example, the non-AP STA 110-1 may operate in the 2.4 GHz frequency band, the non-AP STA 110-2 may operate in the 5 GHz frequency band, and the non-AP STA 110-3 may operate in the 6 GHz frequency band. In some embodiments, each STA includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller is implemented within a processor, such as a microcontroller, a host processor, a host, a DSP, or a CPU, which can be integrated in a corresponding transceiver.

In the embodiment depicted in FIG. 1, the STA MLD 108 communicates with the AP MLD 102 via multiple communication links 106-1, 106-2, and 106-3. For example, each of the non-AP STAs 110-1, 110-2, or 110-3 communicates with an AP 104-1, 104-2, or 104-4 via corresponding communication links 106-1, 106-2, or 106-3. Although the STA MLD 108 is shown in FIG. 1 as including three non-AP STAs, other embodiments of the STA MLD 108 may include fewer than three non-AP STAs or more than three non-AP STAs. In addition, although the AP MLD 102 communicates (e.g., wirelessly communicates) with the STA MLD 108 via multiple links 106-1, 106-2, 106-3, in other embodiments, the AP MLD 102 may communicate (e.g., wirelessly communicates) with the STA MLD 108 via more than three communication links or less than three communication links.

In a multi-link operation, an STA multi-link device (STA MLD), such as STA MLD 108 depicted in FIG. 1, may receive beacons on one link or on multiple links. When an STA MLD receives beacons only on one link, such as link1 106-1 depicted in FIG. 1, the beacons received on link1 include buffer frame indications (partial virtual bitmap) for all links (e.g., link1 106-1, link2 106-2, and link3 106-3 as depicted in FIG. 1) of the STA MLD. Alternatively, if there is at least one link (e.g., link2 106-2) where no beacons are being received, the buffer frame indication (partial virtual bitmap) for link2 106-2 needs to be transmitted on at least another link (e.g., link1 106-1) via beacons or other management frames (e.g., Traffic Identification Map (TIM) frames).

An STA multi-link device utilizing more than one link may decide to monitor the beacons on one link only. For example, STA MLD 108 depicted in FIG. 1 may select one of three links, link1 106-1, link2 106-2, or link3 106-3, as the link on which beacons will be monitored. The selected link can be the link for the STA MLD's multi-link association (e.g., association link, master link, anchor link) or any other link. A technique by which a link is selected to be the working link for an STA MLD's multi-link association is described herein. In some embodiments, the STA MLD changes the selected on which beacons will be monitored without notifying an AP MLD. In some embodiments, after an association link (e.g., link1 106-1) becomes inactive via a link switch or a link turning on/off, the STA MLD (e.g., STA MLD 108) indicates whether the STA MLD wants to monitor beacons on one link (e.g., link2 106-2) or more than one link (e.g., link2 106-2 and link3 106-3), and the link (e.g., link2 106-2) where it wants to monitor beacons and receive group-addressed frames. In one embodiment, the STA MLD makes a negotiation-based decision such that either (i) the STA MLD (e.g., STA MLD 108 depicted in FIG. 1) makes a request for a certain link (e.g., link1 106-1) to be selected as a working link, and the AP MLD (e.g., AP MLD 102) decides whether the requested link (e.g., link1 106-1) is accepted, or (ii) the AP MLD makes a request for a certain link to be selected as a working link, and the STA MLD decides whether the requested link is accepted. In another embodiment, the STA MLD makes an indication-based decision such that either (i) the STA MLD (e.g., STA MLD 108 depicted in FIG. 1) makes the decision to select a certain link (e.g., link1 106-1) as a working link and notifies the decision to the associated AP MLD (e.g., AP MLD 102), or (ii) the AP MLD makes the decision to select a certain link as a working link and notifies the decision to the associated STA MLD. Then, subsequent to the accepted negotiation-based or indication-based accepted request/decision, the selected link becomes a working link and the STA-MLD begins to monitor and decode beacons for the STA MLD's multi-link association.

When an STA MLD selects/decides not to receive beacons on one of the working links (e.g., link1), the STA MLD may miss updated critical operating parameters (or a critical update) of the link (e.g., link1) that are sent by the AP MLD. Examples of the critical update may include inclusion of a Channel Switch Announcement element, inclusion of an Extended Channel Switch Announcement element, modification of the Enhanced Distributed Channel Access (EDCA) parameters element, inclusion of a Quiet element, modification of a direct-sequence spread spectrum (DSSS) Parameter Set, modification of a Compact Flash (CF) Parameter set element, modification of the High-Throughput (HT) Operation element, inclusion of a Wide Bandwidth Channel Switch element, inclusion of an Operating Mode Notification element, inclusion of a Quiet Channel element, modification of a Very High-Throughput (VHT) Operation element, modification of a High-Efficiency (HE) element, insertion of a Broadcast Target Wake Time (TWT) element, inclusion of a BSS Color Change Announcement element, modification of a multiple-user (MU) Parameter Set element, modification of a Spatial Reuse Parameter Set element, or modification of a Uplink Orthogonal Frequency-Division Multiple Access-based Random Access (UORA) Parameter Set element. In some embodiments, the STA MLD may miss updates to certain critical operating parameters that may have changed (e.g., BSS color change, channel switch, etc.). For a multi-link STA MLD to correctly transmit/receive frames through the associated links, the STA MLD must continue to receive updated critical operating parameters for all of the associated links in time.

In accordance with an embodiment of the invention, a technique for multi-link communications may include, at a multi-link STA device (STA MLD) that supports a first link (e.g., link1) and a second link (e.g., link2), receiving a beacon on link2, acquiring an updated critical operating parameter for link1 in response to the beacon received on link2, and operating link1 according to the acquired updated critical operating parameter. For example, acquiring an updated critical operating parameter for link1 in response to a beacon that includes an indication of a critical update in link1 that is received on link2 and indicates an occurrence of a critical update in link1 may involve triggering the receiving of beacons on link1, using a Probe Request on link2 to solicit a Probe Response on link2, or reading information carried in the beacon on link2 if the beacon transmitted on link2 carries the updated critical operating parameters of link1. In one embodiment, acquiring an updated critical operating parameter includes either (i) receiving a beacon on link2 that includes an announcement that link1 has an updated critical operating parameter, and upon receiving the announcement on link2 at the STA MLD, starting to receive beacons on link1 to acquire the updated critical operating parameter, or (ii) acquiring the updated critical operating parameter for link1 by using a Probe Request sent by an STA MLD on link1 to solicit a Probe Response on link1, such that the Probe Response on link1 carries the updated critical operating parameter of link1, or (iii) acquiring the updated critical operating parameter for link1 by using the Probe Request sent by the STA MLD on link2 to solicit the Probe Response on link2, such that the Probe Response on link2 carries the updated critical operating parameter of link1. In another embodiment, acquiring an updated critical operating parameter for link1 involves reading from information carried in the beacon on link2, such that the information is an updated critical operating parameter for link1. Using such a technique enables multi-link communication systems to selectively monitor beacons on less than all of the working links. By selectively monitoring beacons on less than all of the working links, the STA MLD can operate more efficiently and save power.

A technique for multi-link communication management that involves allowing an STA MLD to acquire updated critical operating parameters for a link on which beacons are not received is described in further detail below with reference to FIGS. 2A-2C and 3.

Figure 2A:
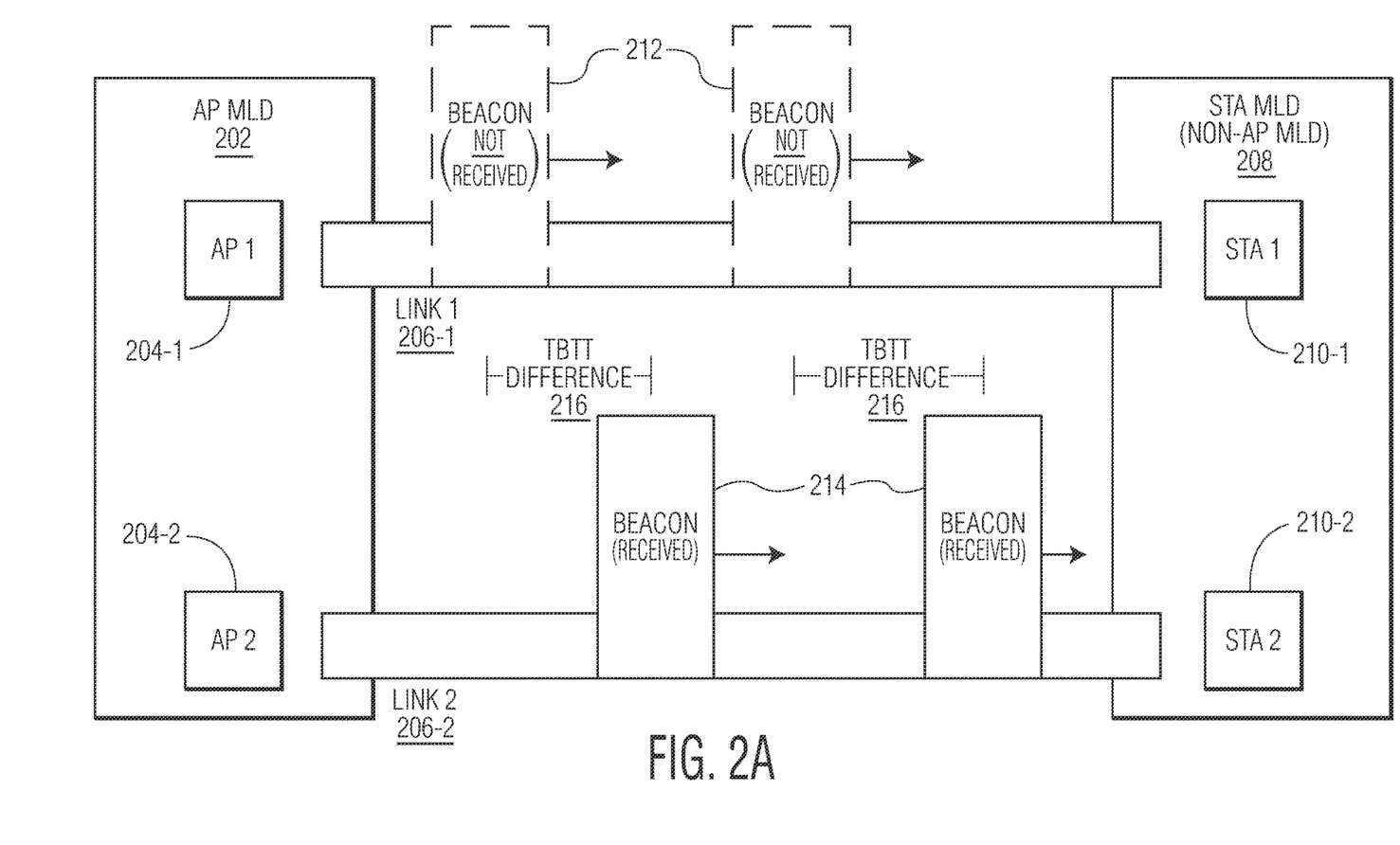
FIG. 2A illustrates an example of a technique for link monitoring that can be used in the multi-link communications system depicted in FIG. 1.

FIG. 2A illustrates a technique for multi-link communications that can be used in the multi-link communications system depicted in FIG. 1. The technique illustrated by FIG. 2A is one example of a process that leads to acquiring an updated critical operating parameter for link1, such that a beacon on link2 includes an announcement that link1 has an updated critical operating parameter and upon receiving the announcement on link2 at the STA MLD, triggering the receiving of beacons on link1 to acquire the updated critical operating parameter. According to the technique, when an STA MLD utilizing more than one working link (e.g., link1 and link2) selects to monitor beacons on one link (e.g., link2) only, the STA (e.g., STA1) associated with the other link (link1) will no longer receive beacons. For example, FIG. 2A illustrates an STA MLD 208 that has selected only link2 206-2 to monitor beacons for the multi-link communications system. In such an example, STA1 210-1 does not receive beacons 212 on working link1 206-1 sent from AP1 204-1 of AP MLD 202 (as indicated by the dashed boxes), and STA MLD 208 receives beacons 214 at STA2 210-2 on working link2 206-2 sent from AP2 204-2 of AP MLD 202. Thus, STA1 only expends resources to receive beacons when the beacons contain the updated critical operating information. In some embodiments, the beacons 214 received on link2 206-2 include an announcement, such that the announcement includes information that the beacons being transmitted on link1 206-1 include an updated critical operating parameter and triggers the receiving of beacons on link1. Examples of an updated critical operating parameter may include a BSS Color Change, EDCA parameter change, HT/VHT/HE/EHT operation parameter change, spatial reuse parameter change, etc. In some embodiments, the beacons 214 on link2 206-2 include a Target Beacon Transmission Time (TBTT) difference 216 between link1 206-1 and link2 206-2 (e.g., in a reduced neighbor report). In some embodiments, the beacons 214 on link2 206-2 include updated critical operating parameters (e.g., (extended) channel switch, Quiet Element, etc.) of link1 to be read, in which the reception of the beacons 212 on link1 206-1 are not needed for acquiring the critical updated operating parameters of link1.

In the embodiment depicted in FIG. 2A, the STA MLD 208 communicates with the AP MLD 202 via multiple communication links 206-1 and 206-2. For example, each of the non-AP STAs 210-1 and 210-2 communicates with an AP 204-1 or 204-2 via corresponding communications link 206-1 or 206-2. Although the STA MLD 208 is shown in FIG. 2A as including two non-AP STAs, other embodiments of the STA MLD 208 may include more than two non-AP STAs. In addition, although the AP MLD 202 communicates (e.g., wirelessly communicates) with the STA MLD 208 via multiple links 206-1 or 206-2, in other embodiments, the AP MLD 202 may communicate (e.g., wirelessly communicates) with the STA MLD 208 via more than two communication links. Further, although the AP MLD 202 transmits two beacons 212, and 214 to STAs via multiple links 206-1 or 206-2, in other embodiments, the AP MLD 202 may transmit fewer than two beacons or more than two beacons via one link or multiple links.

Figure 2B:
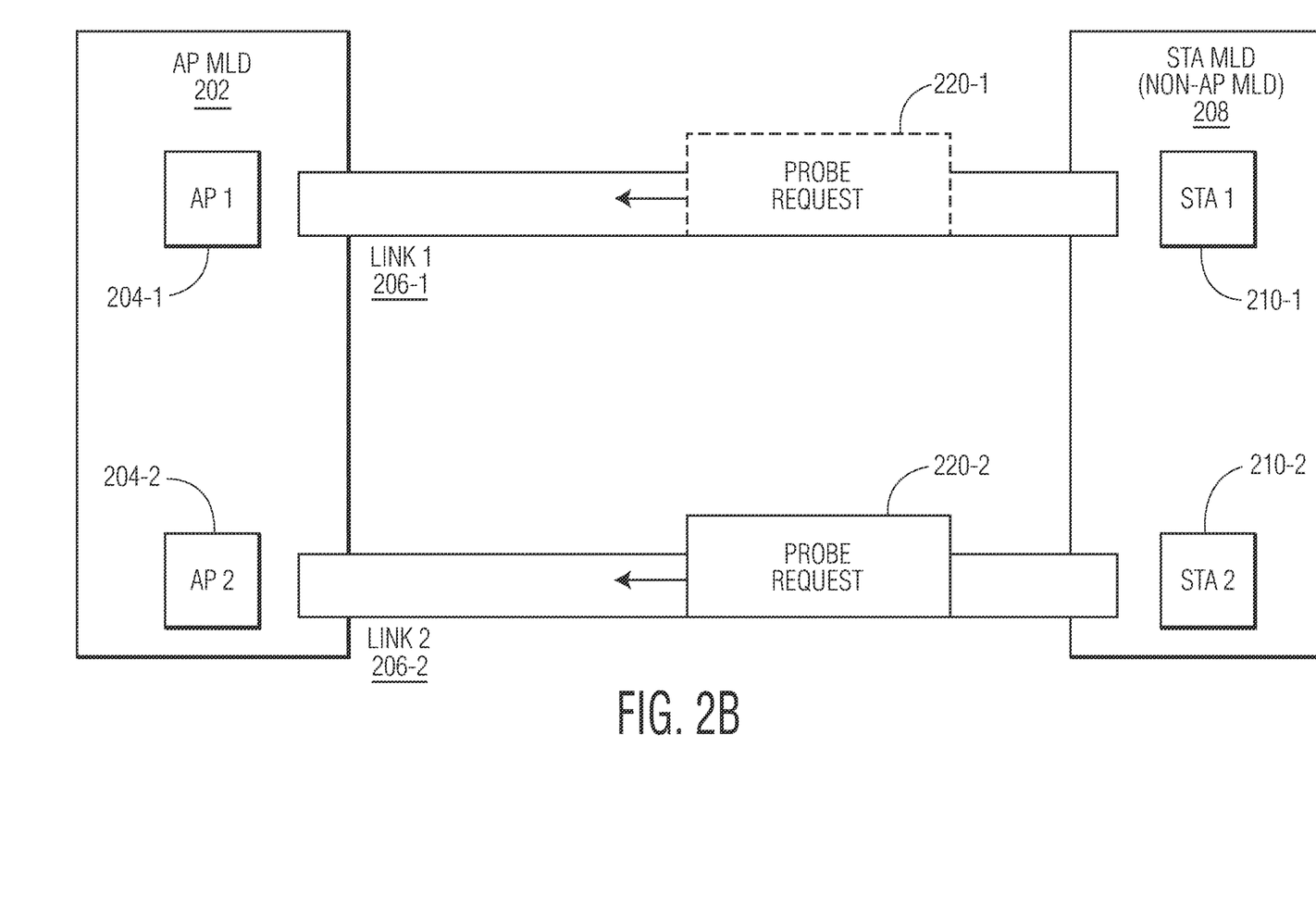
FIG. 2B illustrates another example of a technique for link monitoring that can be used in the multi-link communications system depicted in FIG. 1.

While FIG. 2A illustrates one example of a process that leads to acquiring an updated critical operating parameter for link1, the technique illustrated in FIG. 2B is an example of an alternative process that leads to acquiring an updated critical operating parameter for link1, such that in response to receiving an announcement carried in a beacon on link2 at an STA MLD, an updated critical operating parameter is acquired for link1 using a Probe Request (or other management frame) on link1 or link2 to solicit a Probe Response and acquire the updated critical operating parameter of link1 via link1 or link2. According to the technique, when an STA MLD (e.g., STA MLD 208 depicted in FIG. 2B) decides that it will only monitor beacons on one link (e.g., link2 206-2), STA1 210-1 no longer receives beacons on link1 206-1 from AP1 204-1 of AP MLD 202 and the STA MLD 208 can use a Probe Request (or other management frame) to solicit a Probe Response and acquire an updated critical operating parameter on link1 if the beacon received on link2 includes the announcement of link1's critical update. In one embodiment, acquiring the updated critical operating parameter for link1 206-1 involves using a Probe Request (or other management frame) 220-1 (as indicated by the dashed box) on link1 206-1 to solicit a Probe Response (not shown) on link1 206-1 and acquire the updated critical operating parameter for link1 206-1 via link1 206-1. In another embodiment, acquiring the updated critical operating parameter for link1 206-1 involves using a Probe Request (or other management frame) 220-2 on link2 206-2 to solicit a Probe Response (not shown) on link2 206-2 and acquire the updated critical operating parameter for link1 206-1 via link2 206-2. In some embodiments, the Probe Request (or other management frame) 220-2 is sent from STA2 210-2 on link2 206-2 to AP2 204-2 of AP MLD 202. In some embodiments, the Probe Request (or other management frame) 220-1 (as indicated by the dashed box) is sent from STA1 210-1 on link1 206-1 to AP1 204-1 of AP MLD 202.

In the embodiment depicted in FIG. 2B, the STA MLD 208 sends one Probe Request (or other management frame) 220-1 or 220-2 to APs via multiple links 206-1 or 206-2, in other embodiments, the STA MLD 208 may send fewer than one Probe Request (or other management frame) or more than one Probe Request (or other management frame) via one link or multiple links.

Figure 2C:
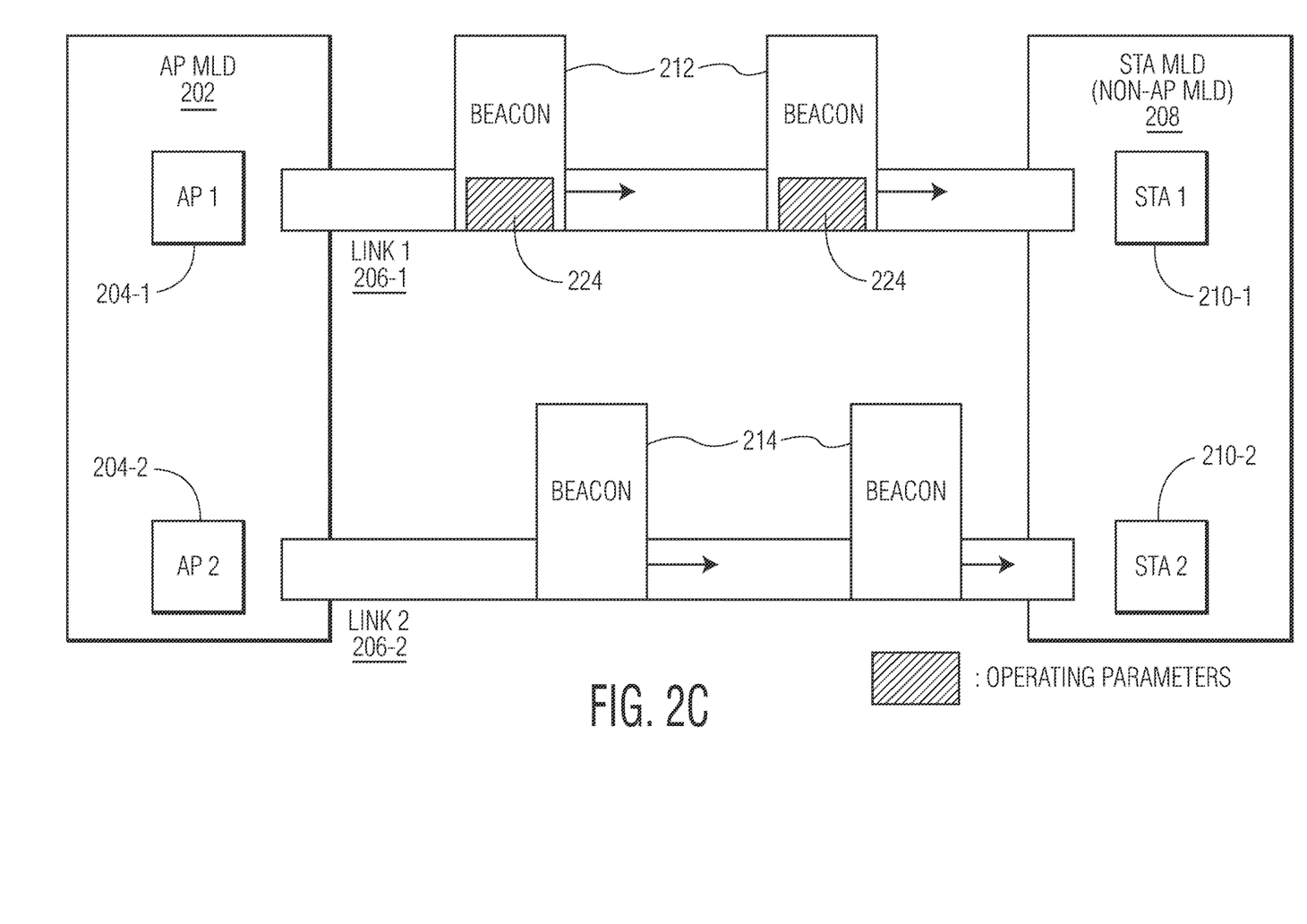
FIG. 2C illustrates a subsequent stage of the link monitoring techniques illustrated in FIGS. 2A and 2B.
Figure 3:
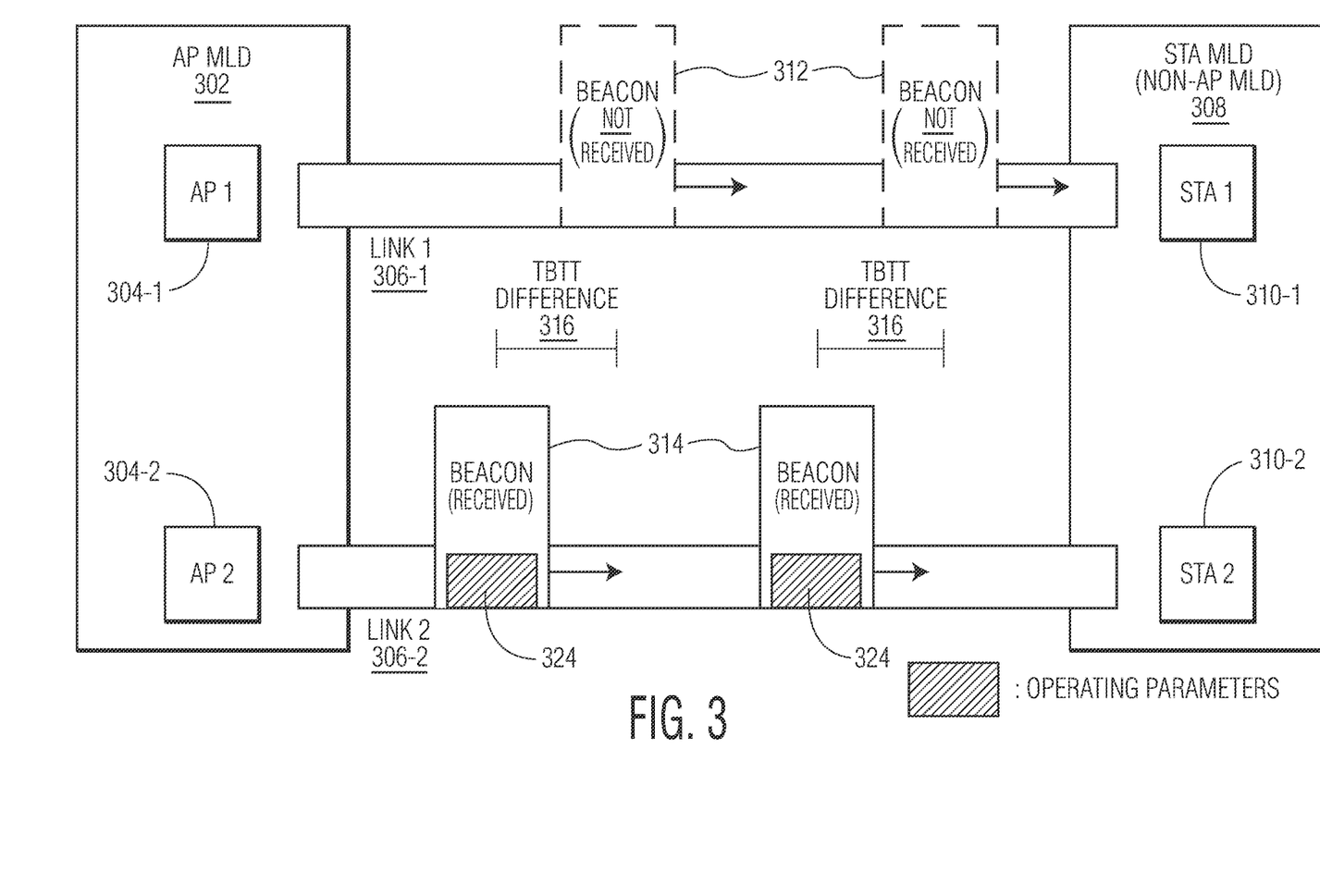
FIG. 3 illustrates another example of a technique for link monitoring that can be used in the multi-link communications system depicted in FIG. 1.

FIG. 2C illustrates another example of a process that leads to acquiring an updated critical operating parameter for link1, the technique illustrated in FIG. 2C is an example of an alternative process that leads to acquiring an updated critical operating parameter for link1, such that in response to receiving an announcement carried in a beacon on link2 at an STA MLD, an updated critical operating parameter is acquired for link1. The technique illustrated by FIG. 2C may also represent a subsequent stage of the link monitoring techniques illustrated in FIGS. 2A and 2B. For example, after transmission of an announcement, Probe Request, or other management frame as illustrated in FIGS. 2A and 2B, the STA MLD acquires an updated critical operating parameter that operates a link according to the acquired updated critical operating parameter. For example, upon receiving an announcement that includes an updated critical operating parameter for link1 from a beacon received on link2 at the STA MLD, the STA MLD can trigger the receipt of beacons on link1 to acquire an updated critical operating parameter for link1 in response to the beacon received on link2. That is, start receiving beacons on link1 to acquire an updated critical operating parameter for link1 in response the beacon received on link2. FIG. 3 illustrates such an example, in which STA1 210-1 of STA MLD 208 receives beacons 212 on link1 206-1 sent from AP1 204-1 of AP MLD 202, such that the beacons 212 on link1 206-1 include link operating parameters 224. Examples of a critical operating parameter may include a BSS Color Change, EDCA parameter change, HT/VHT/HE/EHT operation parameter change, spatial reuse parameter change, etc. In response to receiving a beacon 212 on link1 206-1, such that the beacon 212 includes a link operating parameter 224, link1 206-1 acquires an updated critical operating parameter and operates link1 according to the acquired updated critical operating parameter. In some embodiments, operating link1 according to the acquired updated critical operating parameter involves the STA MLD 208 using the updated critical operating parameter 224 to implement link1 206-1 as a working link. In some embodiments, once the updated critical operating parameters are acquired, the STA MLD 208 stops the reception of beacons 212 on link1 206-1.

In the embodiment depicted in FIG. 2C, the AP MLD 202 transmits two beacons 212 and 214 to STAs via multiple links 206-1 or 206-2, in other embodiments, the AP MLD 202 may transmit fewer than two beacons or more than two beacons via one link or multiple links.

While FIGS. 2A-2C illustrate an example of a process that leads to acquiring an updated critical operating parameter for link1, FIG. 3 illustrates another example of a technique for link monitoring that can be used in the multi-link communications system depicted in FIG. 1. The technique illustrated by FIG. 3 is another example of a process that leads to acquiring an updated critical operating parameter for link1, such that acquiring the updated critical operating parameter for link1 involves reading information carried in the beacon on link2. According to the technique, when an STA MLD utilizing more than one working link (e.g., link1 and link2) to monitor beacons, decides to monitor beacons on one link (e.g., link2) only, the STA associated with the other link (e.g., link1) will no longer receive beacons and the STA MLD will acquire updated critical operating parameters for one link (e.g., link1) via the beacons monitored on another link (e.g., link2). For example, when the STA MLD 308 selects to monitor beacons 314 on link2 306-2, STA1 310-1 does not receive beacons 312 on working link1 306-1 sent from AP1 304-1 of AP MLD 302 (as indicated by the dashed boxes). In such an example, acquiring the updated critical operating parameter 324 (or operating parameters) for link1 involves reading information carried in beacons 314 on link2 306-2, in which the beacons 314 are sent by AP2 304-2 of AP MLD 302 and received by STA2 310-2 of STA MLD 308, and link1 306-1 is then operated according to the acquired updated critical operating parameter 324. Examples of a critical operating parameter may include a BSS Color Change, EDCA parameter change, HT/VHT/HE/EHT operation parameter change, spatial reuse parameter change, etc. In some embodiments, the information carried in beacons 314 on link2 306-2 include a TBTT difference 316 between link2 306-2 and link1 306-1.

In some embodiments, when an STA MLD and an associated AP MLD agree that the STA MLD does not need to monitor the beacons on a link (e.g., link1), the buffered frame information of the STA MLD on that link (e.g., link1) should be at least transmitted on another link (e.g., link2). After the STA MLD and the associated AP MLD agree on a specific link for such transmission, the associated AP MLD may additionally transmit the buffered frame information of a link (e.g., link1) on a link other than the agreed upon link. When an STA MLD and an associated AP MLD agree that the STA MLD does not need to monitor the beacon on a link (e.g., link1), the buffered frame information of the STA MLD on the link (e.g., link1) may be transmitted on that link (e.g., link1).

In some embodiments, when an STA MLD monitors the beacons on a link (e.g., link1), the buffered frame information of the STA MLD on link1 may be transmitted on another link (e.g., link2). In such an embodiment, the partial virtual bitmap of link1 being transmitted on link2 can be the same or different as the partial virtual bitmap of link1 being transmitted on link1, such that the bitmap includes a bit that corresponds to an Association ID (AID) or AIDs of an STA MLD and shall be set to the same value if link1 and link2 are used to transmit the STA MLD's frames of all Traffic Identifiers (TIDs).

In some embodiments, when an STA MLD and an associated AP MLD agree that the STA MLD monitors the beacons on some of the working links, the AP MLD transmits group addressed frames for the STA MLD on at least one of the links that the STA MLD monitors the beacons. In such an embodiment, because the AP MLD transmits group addressed frames, the STA MLD is sure to be one of the recipients of the group addressed frames. Alternatively, the STA MLD and AP MLD may negotiate a link for the AP MLD to transmit group addressed frames for the STA MLD. In another embodiment, an AP MLD transmits group addressed frames as per an STA MLD's notification. For example, when no addressed STA MLDs of a multicast frame selects a link, the AP MLD does not transmit the multicast frame on the link.

In addition to receiving beacons and managing links on a multi-link communications system, an STA MLD can also select a listen interval, such that the selected listen interval can be the same or different for the STA MLD's various links. The listen interval can be used by the STA MLD to indicate to an AP how often a STA is in power save mode (e.g., asleep) and when the STA MLD is awake (e.g., active) to listen to the beacons sent by an AP MLD and the AP MLD's APs or multiple AP MLDs. In some embodiments, the listen interval can be used to determine a lifetime of a frame, such that if the frame's lifetime passes and the frame is not transmitted correctly, the frame is discarded. In some embodiments, the STA MLD can select the same listen interval for all of the STA MLDs working links.

In some embodiments, an STA MLD selects different listen intervals for the working links. For example, in the case in which there is a ListenInterval1 and BeaconInterval1 for a link (e.g., link1), as well as a ListenInterval2 and BeaconInterval2 for another link (e.g., link2), the associated AP MLD announces the buffered frame information of link1 on link2's beacon using an interval of either floor(ListenInterval1/Beacon_Interval2) or ceiling (ListenInterval1/BeaconInterval2). In such an example, the STA MLD wake up at TBTTs of link2 is either a timing synchronization function (TSF) time of TBTT divided by ListenInterval2 as an integer or is (i) immediately before n*ListenInterval1 or (ii) immediately after n*ListenInterval1.

Figure 4:
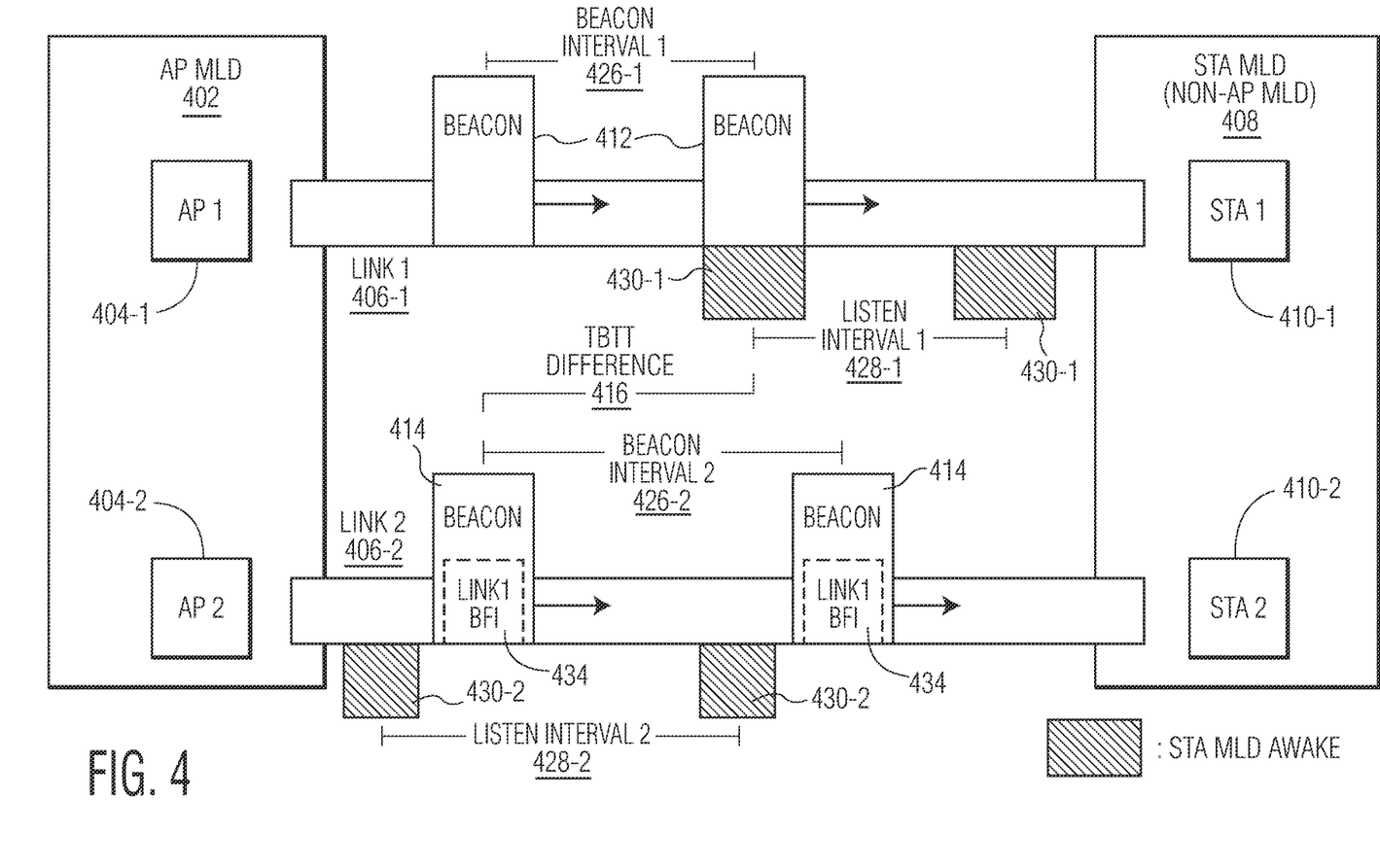
FIG. 4 illustrates an example of transmission across links in the multi-link communications system depicted in FIG. 1.

FIG. 4 illustrates an example of a technique for transmission across links in the multi-link communications system depicted in FIG. 1. While FIGS. 2A-3 illustrate the transmission of beacons and Probe Requests to acquire updated critical operating parameters for a link, FIG. 4 illustrates the various intervals at which information is transmitted. The process of FIG. 4 illustrates a technique that involves an STA MLD using listen intervals at different rates to indicate to the AP MLD how often the STA MLD is in power save mode and wakes to listen to beacons. In some embodiments, a listen interval can be used to decide the lifetime of a frame, such that if a frame's lifetime passes and the frame is not transmitted correctly, the frame may be discarded. FIG. 4 further illustrates an AP MLD transmitting beacons at different rates to indicate the AP MLDs presence to the STA MLD. In particular, as shown in FIG. 4, STA1 410-1 of STA MLD 408 uses listen intervals 430-1 at a particular rate of ListenInterval1 428-1 to AP1 404-1 of AP MLD 402 while STA2 410-2 of STA MLD 408 uses listen intervals 430-2 at a particular rate of ListenInterval2 428-2 to AP2 404-2 of AP MLD 402. FIG. 4 further illustrates beacons 412 transmitted by AP1 404-1 of AP MLD 402 to STA1 410-1 of STA MLD 408 at a particular rate of BeaconInterval1 426-1, and beacons 414 transmitted by AP2 404-2 of AP MLD 402 to STA2 410-2 of STA MLD 408 at a particular rate of BeaconInterval2 426-2. In such an example, the AP MLD 402 sends buffered frame information (BFI) 434 (as indicated by the dashed boxes) related to link1 406-1 in beacon 414 on link2 406-2 to STA2 410-2 of STA MLD 408 from AP2 404-2. In some embodiments, the information carried in beacons 414 on link2 406-2 include a TBTT difference 416 between link2 406-2 and link1 406-1.

In the embodiment depicted in FIG. 4, the AP MLD 402 transmits two beacons 412 and 414 to STAs via multiple links 406-1 or 406-2 at a rate of BeaconInterval1 426-1 or BeaconInterval2 426-2. In other embodiments, the AP MLD 402 may transmit fewer than two beacons or more than two beacons via one link or multiple links at different beacon interval rates. Additionally, although the STA MLD 408 uses listen intervals 430-2 from STA2 410-2 on link2 406-2 at a rate of ListenInterval2 428-2 and listen intervals 430-1 from STA1 410-1 on link1 406-1 at a rate of ListenInterval1 428-1, the STA MLD 408 may communicate using less than two listen intervals or more than two listen intervals at different listen interval rates.

Figure 5:
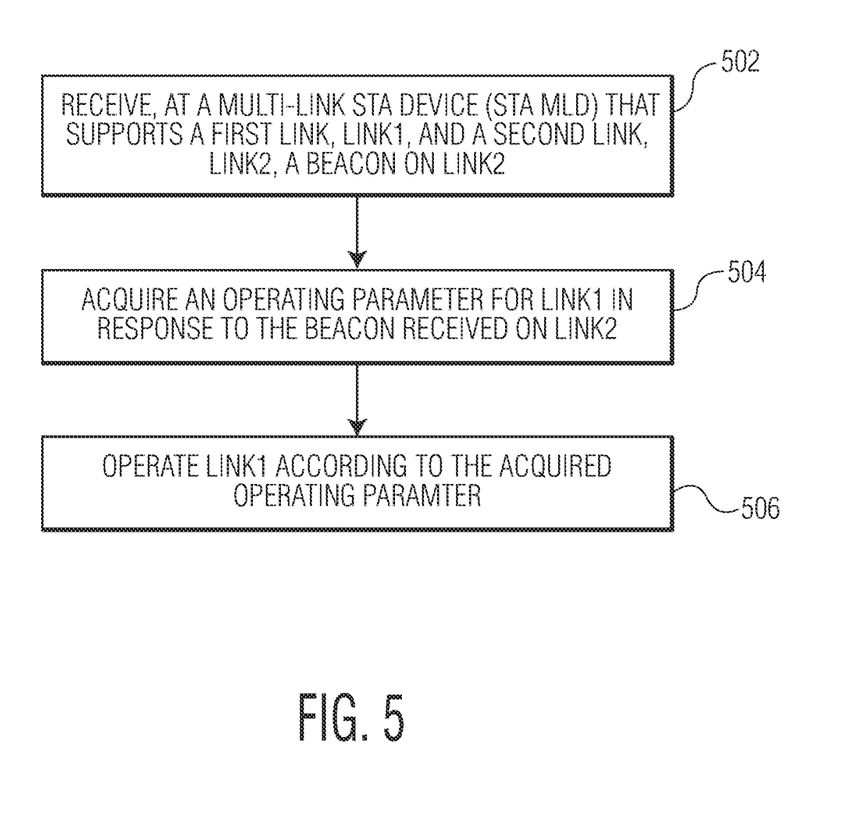
FIG. 5 illustrates a flow diagram of a technique for link monitoring that can be used in the multi-link communications system depicted in FIG. 1.

A technique for link monitoring that can be used in the multi-link communications system depicted in FIG. 1 is described with reference to a flow diagram of FIG. 5. At block 502, a multi-link STA device (STA MLD) that supports a first link, link1, and a second link, link2, receives a beacon on link2. As an example, the STA MLD may be STA MLD 208, link1 may be link1 206-1, link2 may be link2 206-2, and the beacon may be beacon 212 in a multi-link communications system. At block 504, the STA MLD may acquire an updated critical operating parameter for link1 in response to the beacon received on link2. At block 506, the STA MLD may operate link1 according to the acquired updated critical operating parameter.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk.

Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of multi-link communications, the method comprising:
   at a multi-link STA device (STA MLD) that supports a first link, link1, and a second link, link2,
   receiving from an access point (AP) MLD a beacon on link2 that includes an announcement that link1 has a critical operating parameter;
   transmitting, by the STA MLD, a Probe Request in response to the announcement included in the beacon received on link2, wherein the Probe Request solicits a Probe Response, and wherein the Probe Response carries the critical operating parameter for link1;
   receiving, by the STA MLD, the Probe Response, wherein the Probe Response carries the critical operating parameter for link1;
   acquiring the critical operating parameter for link1 via the received Probe Response;
   operating link1 according to the acquired critical operating parameter;
   selecting, by the STA MLD, a first listen interval, ListenInterval1, and a first beacon interval, BeaconInterval1, for link1, and a second listen interval, ListenInterval2, and a second beacon interval, BeaconInterval2, for link2; and
   receiving, by the STA MLD, a buffered frame information announcement of link1 in the beacon on link2 with an interval that is at least one of floor(ListenInterval1/BeaconInterval2) and ceiling(ListenInterval1/BeaconInterval2).

2. The method of claim 1, wherein acquiring the critical operating parameter for link1 includes triggering the receiving of beacons on link1.

3. The method of claim 1,
   wherein when the STA MLD receives the beacon that includes the announcement on link2, the STA MLD starts receiving beacons on link1.

4. The method of claim 1, wherein the beacon on link2 includes a Target Beacon Transmission Time (TBTT) difference between link1 and link2.

5. The method of claim 1, wherein acquiring the critical operating parameter for link1 involves reading information carried in the beacon on link2 if the beacon on link2 carries the critical operating parameters of link1.

6. The method of claim 1, wherein:
   the Probe Request is transmitted on link1 to solicit the Probe Response on link1; and
   the Probe Response is received on link1.

7. The method of claim 1, wherein:
   the Probe Request is transmitted on link2 to solicit the Probe response on link2; and
   the Probe Response is received on link2.

8. The method of claim 1, wherein the STA MLD is further configured to use a same listen interval for all of the STA MLD's STAs.

9. The method of claim 1, wherein the STA MLD decides which link to transmit the Probe Request and solicit the Probe response on.

10. The method of claim 1, wherein the STA MLD decides to monitor link2 beacons and an STA of the STA MLD that is associated with link1 stops receiving link1 beacons; and
    wherein the STA MLD acquires the critical operating parameter for link1 via the beacon received on link2.

11. The method of claim 1, wherein the STA MLD wakes up at a TBTT on link2 according to at least one of:
    a timing synchronization function (TSF) time of the TBTT divided by ListenInterval2;
    before n*ListenInterval1, wherein n is an integer; and
    after n*ListenInterval1.

12. A multi-link STA device (STA MLD), the STA MLD comprising:
    a processor configured to:
    communicate with an access point (AP) MLD via a first link, link1, and a second link, link2;
    receive from the AP MLD a beacon on link2 that includes an announcement that link1 has a critical operating parameter;
    transmit a Probe Request in response to the announcement included in the beacon received on link2, wherein the Probe Request solicits a Probe Response that will carry the critical operating parameter for link1;
    receive the Probe Response, wherein the Probe Response carries the critical operating parameter for link1;
    acquire the critical operating parameter for link1 via the received Probe Response;
    operate link1 according to the acquired critical operating parameter;
    select, by the STA MLD, a first listen interval, ListenInterval1, and a first beacon interval, BeaconInterval1, for link1, and a second listen interval, ListenInterval2, and a second beacon interval, BeaconInterval2, for link2; and
    receive, by the STA MLD, a buffered frame information announcement of link1 in the beacon on link2 with an interval that is at least one of floor(ListenInterval1/BeaconInterval2) and ceiling(ListenInterval1/BeaconInterval2).

13. The STA MLD of claim 12, wherein the STA MLD is further configured to trigger the receipt of beacons on link1 in response to receiving the beacon on link2.

14. The STA MLD of claim 12,
    wherein when the STA MLD receives the beacon that includes the announcement on link2, the STA MLD starts receiving beacons on link1.

15. The STA MLD of claim 12, wherein the beacon received on link2 includes a Target Beacon Transmission Time (TBTT) difference between link1 and link2.

16. The STA MLD of claim 12, wherein:
    the Probe Request is transmitted on link1 to solicit the Probe Response on link1; and
    the Probe Response is received on link1.

17. The STA MLD of claim 12, wherein:
    the Probe Request is transmitted on link2 to solicit the Probe Response on link2; and
    the Probe Response is received on link2.

18. The STA MLD of claim 12, wherein the STA MLD is further configured to use a same listen interval for all of the STA MLD's STAs.

19. A system comprising:
an access point (AP) multi-link device (MLD) (AP MLD) that includes a processor configured to communicate via a first link, link1, and a second link, link2;
a multi-link STA device (STA MLD) that includes another processor configured to:
  communicate with the AP MLD via link1 and link2;
  receive from the AP MLD a beacon on link2 that includes an announcement that link1 has a critical operating parameter;
  transmit a Probe Request in response to the announcement included in the beacon received on link2, wherein the Probe Request solicits a Probe Response that will carry the critical operating parameter for link1;
  receive the Probe Response, wherein the Probe Response carries the critical operating parameter for link1;
  acquire the critical operating parameter for link1 via the received Probe Response;
  operate link1 according to the acquired critical operating parameter;
  select, by the STA MLD, a first listen interval, ListenInterval1, and a first beacon interval, BeaconInterval1, for link1, and a second listen interval, ListenInterval2, and a second beacon interval, BeaconInterval2, for link2; and
  receive, by the STA MLD, a buffered frame information announcement of link1 in the beacon on link2 with an interval that is at least one of floor(ListenInterval1/BeaconInterval2) and ceiling(ListenInterval1/BeaconInterval2).

* * * * *